Oct. 6, 1964  J. D. DESCHAMPS  3,152,248
INDICATOR DEVICE FOR VERTICAL LANDINGS
Filed May 31, 1961  4 Sheets-Sheet 1
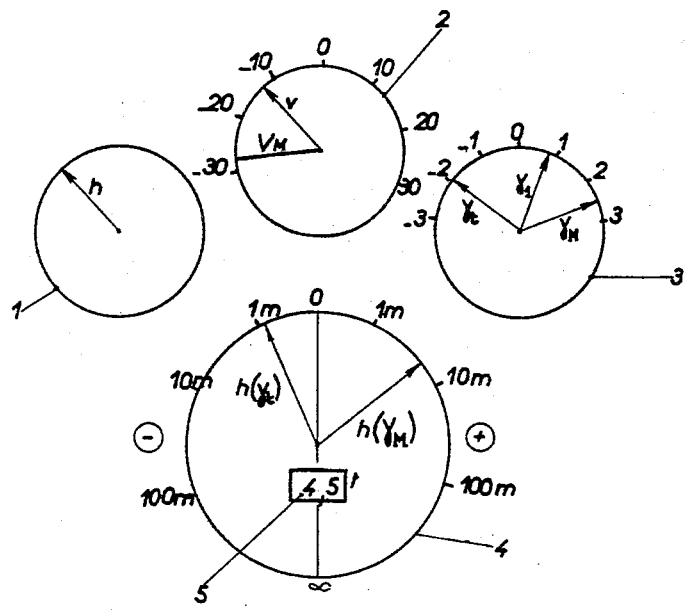
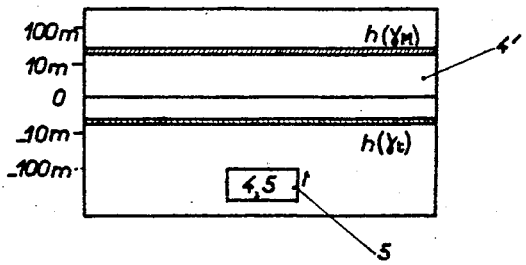
INVENTOR
Jacques D. Deschamps
Watson, Cole, Grindle & Watson
ATTORNEYS Oct. 6, 1964   J. D. DESCHAMPS   3,152,248
INDICATOR DEVICE FOR VERTICAL LANDINGS
Filed May 31, 1961                                 4 Sheets-Sheet 2

INVENTOR
Jacques D. Deschamps

Watson, Cole, Grindle+Watson
ATTORNEYS

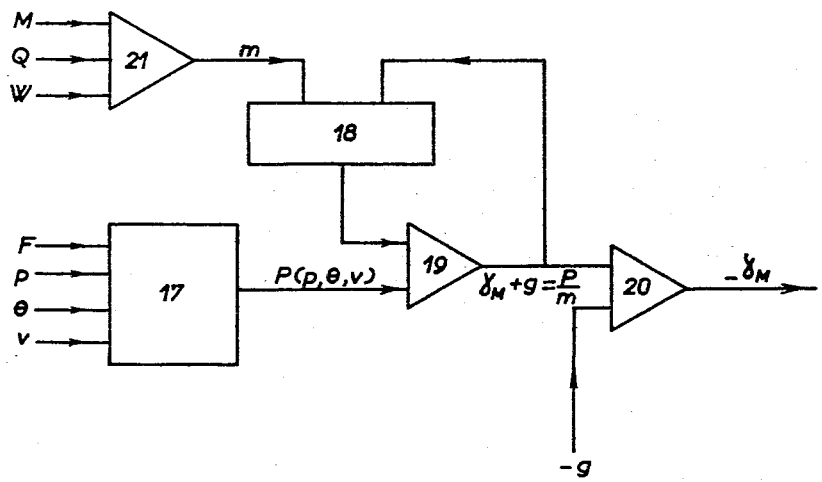
*Fig.: 6*
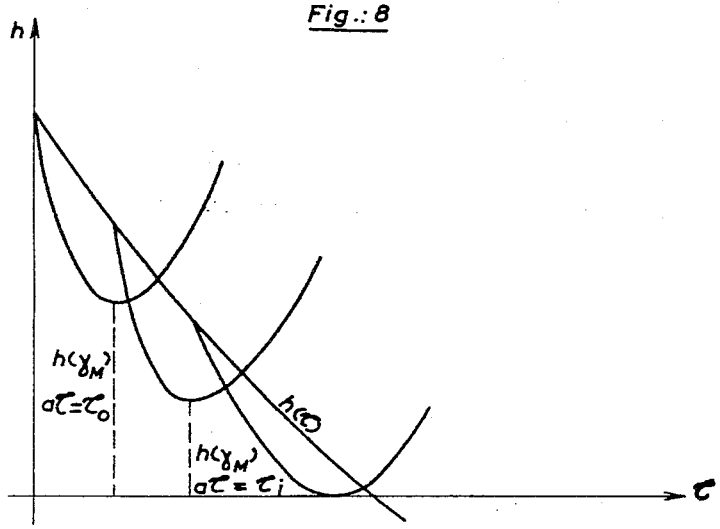
*Fig.: 8*

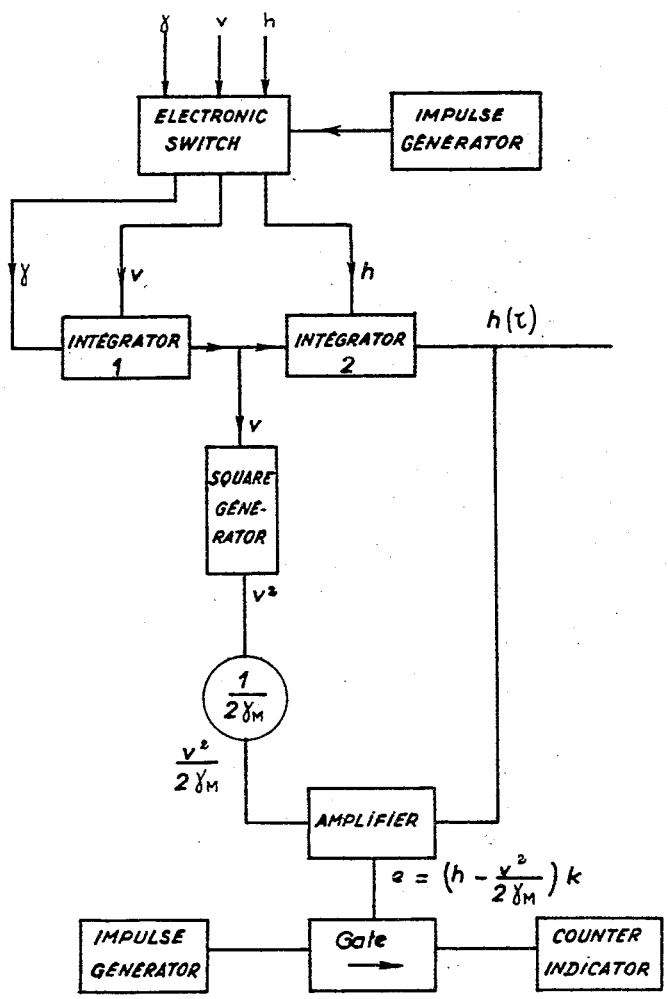

United States Patent Office 3,152,248
Patented Oct. 6, 1964

3,152,248
INDICATOR DEVICE FOR VERTICAL LANDINGS
Jacques Désiré Deschamps, Saint-Cloud, France, assignor to Societe Nationale d'Etude et de Construction de Moteurs d'Aviation, Paris, France, a company of France
Filed May 31, 1961, Ser. No. 113,800
Claims priority, application France, June 9, 1960, 829,474
7 Claims. (Cl. 235—151)

The present invention has for its object an indicator device intended to facilitate the pilot's task during the particularly difficult phase of the approach to the ground of an aircraft which lands vertically, whether the pilot is himself required to carry out the operation or whether he has to control its correct execution in the case of an automatic landing and, when so required, to take over the controls if the automatic pilot becomes defective.

In vertical landing, it is essential that the speed of the aircraft shall be substantially zero when the latter comes in proximity to the ground; this condition is imperative for obvious reasons of safety.

It is however further desirable that the operation of landing shall be as short as possible, since it takes place during a phase when the thrust of the propulsion unit— and therefore its consumption—is in the vicinity of its maximum value.

It is therefore necessary for the human or automatic pilot to regulate the downward speed of the aircraft in a very exact manner, as a function of the altitude. As long as the altitude is great, the aircraft can descend at the maximum speed compatible with its characteristics, but when a certain altitude is reached which depends on the instantaneous speed and acceleration of the aircraft and also on the maximum possible thrust of the propulsion group, the pilot must begin to slowdown in order to reach the ground at substantially zero speed.

Now, this altitude cannot easily be determined by simply reading the measuring instruments usually provided on board aircraft; these instruments could only give the pilot a very rough approximation of the conditions in which the landing is being carried out, which would in any case be definitely inadequate for the execution of an operation which should be at the same time careful and economical.

The present invention puts at the disposal of the pilot a series of indicators which supply directly, at every instant, the indications necessary for effecting or controlling a landing under the desired conditions of safety and economy. This series comprises the following indicators, which are understood to form part of the present invention, both collectively and individually:

(1) An indicator of the maximum obtainable acceleration, which quantity will be designated in the text following by $\gamma M$;

(2) An indicator of the acceleration which, if it were impressed on the aircraft and thereafter remained constant, would enable the ground to be reached at zero speed, this quantity being hereinafter designated by $\gamma l$;

(3) An indicator of the altitude at which the speed would become zero if the instantaneous acceleration $\gamma t$ of the aircraft were maintained constant during the whole period of descent, this value of the altitude being designated in the following description by $h(\gamma t)$;

(4) An indicator of the altitude at which the speed would become zero if the maximum acceleration $\gamma M$ above were applied to the aircraft, and if this acceleration were maintained for the whole period of descent, this value of the altitude being hereinafter designated by $h(\gamma M)$;

(5) An indicator of the period of time $t$ which this last quantity $h(\gamma M)$ would require to become zero if the instantaneous acceleration $\gamma t$ remained constant.

In accordance with one form of embodiment of the invention, the pointers of the acceleration indicators (1) and (2) above are grouped together on the same dial as the pointer of the usual accelerometer or instantaneous acceleration indicator $\gamma t$ of the aircraft, while for their part the altitude indicators 3 and 4 will also be on a single dial, on which could furthermore be shown the indication of the time $t$ given by the instrument (5).

The quantity $\gamma M$ shown by the indicator (1) above is expressed by the following formula:

$$\gamma M = \frac{P}{m} - g \qquad (I)$$

in which P is the maximum thrust which can be developed by the propulsion group of the aircraft, $m$ is the total weight of this latter, and $g$ is the acceleration due to gravity. The thrust P can be determined by prior tests on the engine and corrected to take account of the safety margins, while the total mass or weight $m$ can be estimated by taking into consideration the weight of fuel consumed during the flight and, where this is applicable, the weight of the munitions or other objects previously dropped. It will however be preferable to utilize a suitable device for the automatic measurement of $m$, this device being controlled on the one hand by the usual fuel gauge and on the other hand by a suitable mechanism of any kind which records the weight of the objects as and when dropped during the flight. The value of P may also be corrected to take account of the variations of pressure and temperature of the air and of the influence of the speed.

It will be found that $\gamma M$ varies only slightly, and that its variations, except at the moment of the eventual dropping of any objects, are slow.

The indicator (2) supplies the value of the acceleration $\gamma l$ which is given by the following equation:

$$\gamma l = \frac{v^2}{2h} \qquad (II)$$

in which $v$ is the instantaneous speed of descent of the aircraft, and $h$ is its altitude.

As regards the values of the altitude supplied by the indicators (3) and (4) on the one hand, and the value of the time given by the indicator (5) on the other, these quantities are expressed as follows:

$$h(\gamma t) = \frac{-v^2}{2\gamma t} + h \qquad (III)$$

$$h(\gamma M) = \frac{-v^2}{2\gamma M} + h \qquad (IV)$$

$$t = -v\frac{\sqrt{v^2 - \frac{\gamma t}{\gamma t - \gamma M}(v^2 - 2h\gamma M)}}{\gamma t} \qquad (V)$$

In accordance with the present invention, the desired values of the Equations II, III, IV and V above are prepared by electronic or other calculators of known types, to which are applied the parameters $h$, $v$, and $\gamma t$, measured by conventional control-panel instruments (altimeter, variometer and accelerometer respectively). As regards the parameter $\gamma M$, this will be given either in a direct and approximate manner, or preferably by means of the automatic measuring device defined above.

The description which follows below with reference to the accompanying drawings, which are given by way of example only and not in any limitative sense will make it quite clear how the invention can be carried into effect, the particular features which are brought out either in the text or in the drawings being understood to form a part of the said invention.

FIG. 1 shows an arrangement of the instrument panel comprising a series of indicators in accordance with the present invention.

FIG. 2 shows an alternative form of embodiment of one of the elements.

FIGS. 3, 4, 5, 6 and 7 are basic diagrams of analogue calculators designed to supply respectively the values $\gamma l$, $h(\gamma t)$, $h(\gamma M)$, $\gamma M$ and $t$.

Figure 3:
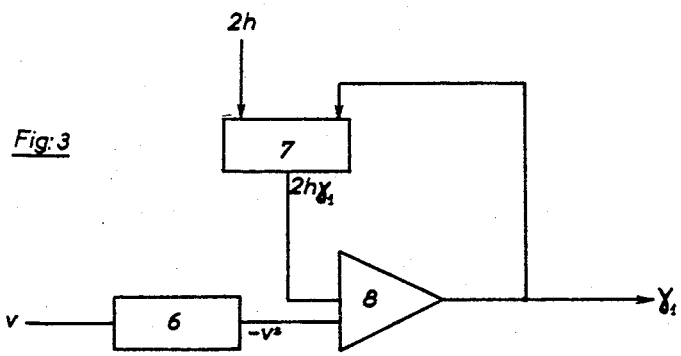

FIG. 8 gives explanatary curves of the operation of the last calculator.

The arrangement shown by way of example in FIG. 1 comprises the dials 1, 2 and 3 of an ordinary altimeter, a variometer and accelerometer which give respectively the parameters $h$, $v$ and $\gamma t$ of the aircraft, that is to say the altitude and also its first and second derivatives. On the dial 2 is shown a reference mark $V_M$ indicating the maximum speed of descent which cannot be exceeded without danger, in view of the characteristics of the aircraft and the safety margins allowed.

In accordance with a particular feature of the present invention, the dial 3 is not reserved solely for the pointer of the accelerometer which indicates $\gamma t$, but also groups together the pointers which give the values of acceleration $\gamma l$ and $\gamma M$ defined in the preample to the present specification.

In addition, a dial 4 groups together the pointers of the indicators which give the altitudes $h(\gamma t)$ and $h(\gamma M)$, and is further provided with a window 5 in which appears the value of the time $t$, which values have also been defined in the above preamble.

Instead of pointers on pivots having their axis on the centre of the dial, there may be provided pointers which move parallel to each other, as shown on the dial 4' of FIG. 2.

In all cases, it is preferable that the scale of altitudes should not be linear, and the accuracy should be increased towards the lower altitudes.

With an arrangement of this kind before his eyes, the pilot can ensure (or verify in the case of an automatic pilot) the correct evolution of the landing operation. To this end, he will proceed in the following manners:

The aircraft being in a vertical position at a fairly high altitude (several hundred metres), the pilot regulates the speed of descent by acting on the thrust in such manner that the downward speed is at most equal to $V_M$ which is the limiting speed indicated by the reference mark on the dial of the variometer 2. This limiting speed of descent takes account of the possibilities of the aircraft in this type of flight, with a certain margin of safety.

On the dial 3 of accelerations, $\gamma t$ is substantially zero since the speed of descent is constant. On the other hand, $\gamma l$—that is to say the theoretical acceleration which should have been attained at that moment in order to reach the ground at zero speed—comes gradually closer to $\gamma M$ which is, it will be recalled, the maximum acceleration which can be obtained with the engines at full thrust.

It is absolutely imperative that $\gamma l$ should remain always smaller than $\gamma M$. In fact, if $\gamma l$ were to exceed $\gamma M$, this would mean, in order to reach the ground with zero speed, that it would be necessary to apply an acceleration greater than the maximum acceleration; as this is impossible by definition, the aircraft would inevitably hit the ground with an appreciable vertical speed.

On the dial 4 or 4', graduated in altitudes at which the speed $v$ would become zero if either the instantaneous acceleration $\gamma t$ or the maximum acceleration $\gamma M$ were maintained constant, the pointer $h(\gamma t)$ is blocked towards the highly negative altitudes, since it will be recalled that the speed of descent is substantially constant. For its part, the pointer $h(\gamma M)$ gradually approaches zero, and the time which remains for $h(\gamma M)$ to effectively reach zero is registered (4.5 seconds in the example illustrated).

If he wishes to make the landing as rapidly as possible, the pilot waits until this time is short enough and then applies the maximum thrust.

At this moment, the point $\gamma t$ of the dial 3 approaches the pointer $\gamma M$ until its coincides with it, while the pointer $h(\gamma t)$ of the dial 4 or 4' similarly approaches the pointer $h(\gamma M)$, which is located in the immediate proximity of zero. If the operation has been carried out correctly, the pointers $h(\gamma t)$ and $h(\gamma M)$ coincide on the zero. This means that the aircraft lands at zero speed and that the landing has been effected in the minimum time.

If it is not required to make a very rapid landing, or if it is desired further to increase the margin of safety, the operation can be carried out otherwise. For example, by acting on the thrust of the reactor, the pilot can make the instantaneous acceleration $\gamma t$ equal to $\gamma l$. It is then certain that the ground will be reached at zero speed, since by definition $\gamma l$ is the constant acceleration required so as to touch the ground with zero speed.

In practice, this landing operation is carried out by regulating the thrust so that the pointers $\gamma t$ and $\gamma l$ of the dial 3 coincide or, which amounts to the same thing, so that the pointer $h(\gamma t)$ of the dial 4 or 4' comes on to zero and remains there.

In the case of an automatic landing, the indicators serve for verification and safety purposes. If, for any particular reason, the landing is not being carried out normally, the pilot can take-over the controls and complete the operation.

It would be possible to carry out a correct automatic landing by making the control of the rate of feed of fuel to the propulsion group dependent on the quantities prepared by the instruments according to the present invention.

For a landing with a high factor of safety, the quantity $\gamma t - \gamma l$ could be employed as an error voltage. This error voltage will drive a servo-motor controlling the flow of fuel to the propulsion group. This signal $\gamma t$ comes from the accelerometer and the quantity $\gamma l$ is calculated by one of the arithmetic or analogue systems of which an example is given below.

In the same way, $h(\gamma t)$ can be utilized to effect an automatic landing. In fact, the landing is correct if $h(\gamma t)$ is zero. It is thus possible to effect a landing with great safety by actuating the servo-motor which controls the flow of fuel by the quantity $h(\gamma t)$.

The indicating instruments, the dials of which are shown in FIGS. 1 and 2, will preferably be galvanometers, although other types of instruments would also be suitable. The signals which control them are derived directly or indirectly depending on the case, from known measuring instruments (not shown) such as:

a frequency-modulation altimeter;
a variometer based on the Doppler-Fizeau effect;
an accelerometer with an electrical return, the measuring shaft of which is maintained vertical by means of a gyroscopic system.

These instruments give the altitude, the speed and the vertical acceleration in the form of electrical voltages. The latter are applied directly to the corresponding galvanometers, and result in displacements of the pointers $h$, $v$ and $\gamma t$ of the dials 1, 2 and 3.

As has been explained above, the value $\gamma M$ can be obtained from the fuel gauge and, where this is applicable, from the detector of objects dropped.

As regards the other quantities $\gamma l$, $h(\gamma t)$, $h(\gamma M)$ and $t$, these are supplied from the preceding four detected quantities by calculators designed to carry out the operations expressed by Equations II, III, IV, and V above.

These calculators may be arithmetic or analogue, and a brief description of analogue calculators will be given below by way of indication.

FIG. 3 represents diagrammatically an analogue calculator which prepares $$\gamma l = \frac{v^2}{2h}$$

For various reasons (accuracy, stability), in analogue calculation, division is replaced by a multiplication in a closed loop. A square generator 6 produces $-v^2$ from the signal $v$ which is derived from the variometer.

The altimeter signal $h$ is doubled and constitutes one of the two inputs of a multiplier 7, the second input of which is connected to the output of a high-gain amplifier 8. The two inputs of the amplifier are $-v^2$ on the one hand and the output of the multiplier 7 on the other. When a balance is reached, the voltage at the input of the amplifier is very substantially zero. Since one of the inputs is $-v^2$, the other is therefore at this moment $2h\gamma l = v^2$, and the output of the amplifier 8 is therefore $\gamma l$.

Figure 4:
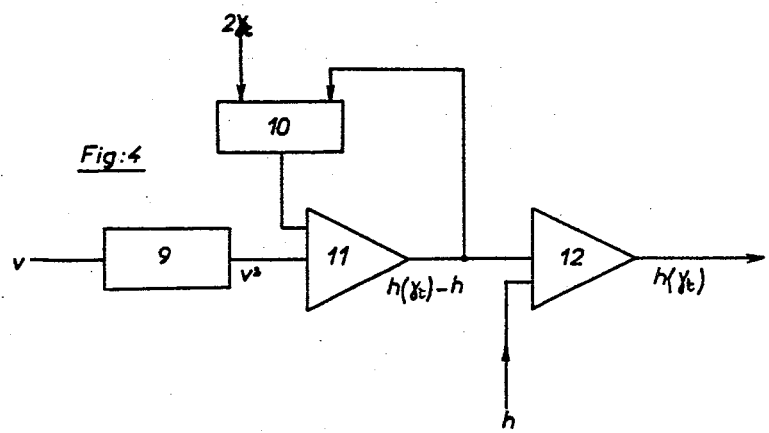

The circuit of FIG. 4 permits the calculation of $$h(\gamma t) = h - \frac{v^2}{2\gamma t}$$

It is substantially identical with the preceding diagram. A square generator 9 receives $v$ and delivers $v^2$. The signal from the accelerometer is doubled and is applied to one of the two inputs of a multiplier 10. By the same reasoning as in the previous case, it can be seen that it is only necessary to loop-back the output of the amplifier 11 (the two inputs of which are $v^2$ and the output of the multiplier 10) on to the second input of the multiplier in order that this output may have the value $h(\gamma t) - h$.

An amplifier 12 performs the addition of these two inputs: $h(\gamma t) - h$ coming from the amplifier 11 and $h$ coming from the altimeter. It thus delivers the desired signal $h(\gamma t)$.

Figure 5:
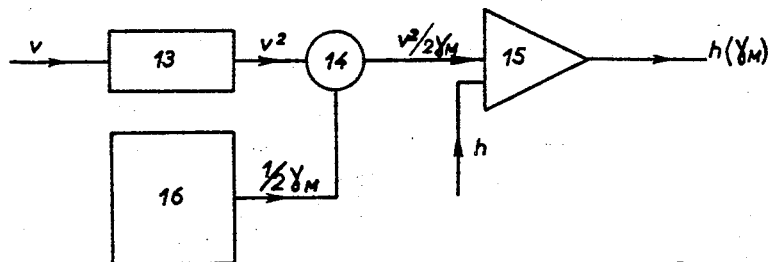

In FIG. 5, there is again shown a square generator 13 which receives $v$ and delivers $v^2$. This voltage $v^2$ is applied to a controlled potentiometer operated by $$\frac{1}{2\gamma M}$$

obtained from a calculator 16. At the output of the potentiometer 14, there is obtained $$\frac{v^2}{2\gamma M}$$

which is added to $h$ in an amplifier 15 which delivers $h(\gamma M)$.

FIG. 6 shows diagrammatically an analogue calculator which prepares $$\gamma M = \frac{P}{m} - g$$

The amplifier 21 has three inputs; it subtracts from the weight M of the aircraft when it starts off, the quantity Q of fuel consumed during the flight and the weight W of the objects dropped, and delivers a voltage which represents the instantaneous weight of the aircraft. From the maximum force F under given conditions of the propulsion group, the pressure $p$ and the temperature $\theta$ of the atmosphere, and the speed $v$ of the aircraft, the stage 17 prepares the force P $(p, \theta, v)$ at its maximum value at the given instant. A multiplier 18 and an amplifier 19 carry out the division $$\frac{P}{m}$$

in accordance with the principle explained above. An amplifier 20 subtracts $g$ from $$\frac{P}{m}$$

and thus delivers $\gamma M$.

The value $t$ will be obtained by a repeating analogue calculator in an example of embodiment shown in FIG. 7. This circuit resolves in "accelerated time" $\tau$ the equation of movement of the aircraft $$\gamma = \frac{d^2 h}{d_t^2}$$

and the equation $$\gamma M = h - \frac{v^2}{2\gamma M}$$

The resolution lasts for example $\frac{1}{100}$ of a second and is repeated at a rapid frequency, for example 50 times per second.

The actual acceleration $\gamma(t)$ stored as a memory in a condenser, is integrated twice, $v(t)$ and $h(t)$ being applied in initial values to the integrators 1 and 2. There are thus obtained the speed and the altitude $v(\tau)$ and $h(\tau)$. At every instant, the quantity is calculated:

$$h(\gamma M)(\tau) = h(\tau) - \frac{v^2(\tau)}{2\gamma M}$$

(see FIG. 8).

This quantity which is first positive, decreases and then becomes zero when $\tau$ has reach the critical value $\tau l$ such that $$\frac{v^2(\tau)}{2\gamma M} = h(\tau l)$$

This value $\tau l$ is proportional to the desired time T1.

As long as $\tau$ is less and $\tau l$, the number of impulses supplied by a calibration impulse generator is counted.

When $\tau = \tau l$, the equation becomes negative and blocks an electronic gate or door which stops the counting of the impulses. The value of $tl$ is thus obtained in digit form.

A generator of release impulses and electronic switches are employed for the periodic application of the voltages $\gamma(t)$, $h(t)$ and $v(t)$.

It will of course be understood that instead of electronic systems, it is possible to use a great variety of types of calculators: mechanical, electro-mechanical, etc.

It is also evident that modifications may be made to the forms of embodiment which have been described above, in particular by the substitution of equivalent technical means, without thereby departing from the scope of the present invention.

What is claimed is:

1. In a vertical landing aircraft equipped with an upward thrust providing power unit and an instrument panel, a device for the control of the vertical landing operation such that touch-down of the aircraft takes place at substantially zero vertical velocity, comprising a first indicator of the altitude at which the vertical velocity would reach zero if the instantaneous actual vertical acceleration of the aircraft were kept constant, said indicator having a first index movable over a dial graduated in positive, zero, and negative altitude values and located on said instrument panel, and a second indicator of the altitude at which the vertical velocity would reach zero if the maximum vertical acceleration were permanently imparted to the aircraft by operating said power unit at full running condition, said second indicator having a second index movable over said dial, means for measuring the instantaneous altitude of the aircraft and supplying a first electric signal of corresponding value $(h)$, means for measuring the instantaneous vertical velocity of the aircraft and supplying a second electric signal of corresponding value $(v)$, means for measuring the instantaneous vertical acceleration of the aircraft and supplying a third electric signal of corresponding value $(\gamma_t)$, means for determining the maximum vertical acceleration obtainable when the power unit is operated at full running condition and supplying a fourth electric signal of corresponding value $(\gamma_m)$, a first computer system to the input of which said first, second and third signals are applied and which supplies a first output signal corresponding to $h - v^2/2\gamma_t$ means responsive to said first output signal for actuating the first index, a second computer system to the input of which said first, second and fourth signals are applied and which supplies a second output signal corresponding to $h - v^2/2\gamma_m$, and means responsive to said second output signal for actuating the second index.

2. In a vertical landing aircraft which has in flight altitude, weight, velocity and acceleration parameters each a function of the instantaneous position of the craft and the function of a power unit providing upward thrust and having an instrument panel, a landing control indicator device comprising a dial graduated in acceleration values and located on said instrument panel having a first and second movable index, first detector means responsive to weight of the aircraft and power available from said unit to provide corresponding signals, a first computer controlling said first index to move it over said dial in response to the value of said corresponding signals to compute therefrom the aircraft maximum vertical acceleration when said power unit operates at maximum power and indicates the computed value on said first index, second detector means responsive to the instantaneous vertical velocity of descent of the aircraft and its instantaneous altitude to provide further corresponding signals, and a second computer controlling said second index to move it over said dial in response to said further corresponding signals showing that value of the aircraft vertical acceleration which if maintained would ensure touch down at substantially zero vertical velocity on said second index, whereby the relative positions of the two indices provide an indication of the margin of safety before the maximum power of said power unit is required to avoid undesirable vertical velocity at touch down.

3. A combination as claimed in claim 2, wherein the means responsive to the instantaneous vertical velocity of the aircraft supplies an electric signal of corresponding value ($v$), the means responsive to the instantaneous altitude of the aircraft supplies an electric signal of corresponding value ($h$), said second computer being responsive to said $v$ and $h$ signals to supply an electric output signal corresponding to $v^2/2h$, and said second index being electrically responsive to said output signal.

4. A combination as claimed in claim 2 including a third index and comprising in addition third detector means responsive to the aircraft altitude and the instantaneous actual vertical acceleration to produce a third set of corresponding signals, and a third computer controlling said third index to move it over said dial in response to the computed value from said third set of signals at which value of altitude the speed of descent becomes zero if the acceleration determined by said third detector means is maintained constant, whereby to facilitate control of landing by maintaining the position of said third index coincident either with that of said first index or that of said second index.

5. A combination as claimed in claim 2, wherein a further dial with two movable indices is provided in the instrument panel having positive, negative and zero altitude value calibrations, third detector means producing signals representing the instantaneous vertical acceleration and altitude of the aircraft third computer means responsive to the last mentioned signals for computing the altitude at which the vertical velocity would reach zero if the aircraft instantaneous actual vertical acceleration were maintained, a first said index on the further dial coupled for movement over said dial in response to said third computer means to signify the altitude value determined by said third computing means, fourth computing means for determining from said instantaneous velocity, altitude and weight signals of the aircraft the altitude at which the vertical velocity would reach zero if the aircraft maximum vertical acceleration available when said power unit operates at maximum power were maintained, and said second index coupled for movement over the further dial in response to the fourth computer means to signify the altitude value determined by the fourth computing means, whereby the instantaneous positions of the last two indices relative to each other and to the zero altitude graduation on the further dial, provide an indication of the margin of safety before the maximum power of said power unit is required to avoid undesirable vertical velocity at touch down.

6. In a vertical landing aircraft which has in flight altitude, weight, velocity and acceleration parameters each a function of the instantaneous position of the craft and the function of a power unit providing upward thrust and having an instrument panel, a landing control indicator device comprising a dial graduated in positive, zero and negative altitude values and located on said instrument panel, first computing means for determining from the instantaneous velocity acceleration and altitudes of the aircraft the altitude at which the vertical velocity would reach zero if the aircraft instantaneous actual vertical acceleration were maintained, a first index movable over said dial in response to first computing means to signify the altitude value determined by said first means, second computing means for determining from the instantaneous velocity, altitude and weight of the aircraft the altitude at which the vertical velocity would reach zero if the aircraft maximum vertical acceleration available when said power unit operates at maximum power were maintained, and a second index movable over said dial in response to the second computing means to signify the altitude value determined by said second means, whereby the instantaneous positions of said indices relative to each other and to said zero altitude graduation provide an indication of the margin of safety before the maximum power of said power unit is required to avoid undesirable vertical velocity at touch down.

7. In a vertical landing aircraft which has in flight altitude, velocity, acceleration and weight parameters each a function of the instantaneous operation of a power unit providing upward thrust, an instrument panel including a landing control indicator device with a dial, a first computer deriving a first function of acceleration and operable to provide the acceleration function in response to a value computed from at least two of said parameters, a first index movable over said dial in response to the computer to signify the computed acceleration function, a further computer deriving a second function of acceleration in response to a different combination of said parameters, and a second index movable over said dial responsive to the further computer to signify the second function of acceleration, the two functions of acceleration being so related that the relative positions of the two indices provide an indication of the margin of safety of the aircraft during descent.

References Cited in the file of this patent
UNITED STATES PATENTS

| 2,246,163 | Cheeseman | June 17, 1941 |
| 2,878,775 | Taylor | Mar. 24, 1959 |
| 2,911,143 | Wright | Nov. 3, 1959 |
| 2,930,549 | Ernst | Mar. 29, 1960 |
| 2,845,649 | Metcalf et al. | July 19, 1960 |
| 2,992,558 | Newell et al. | July 18, 1961 |